Figure 1:
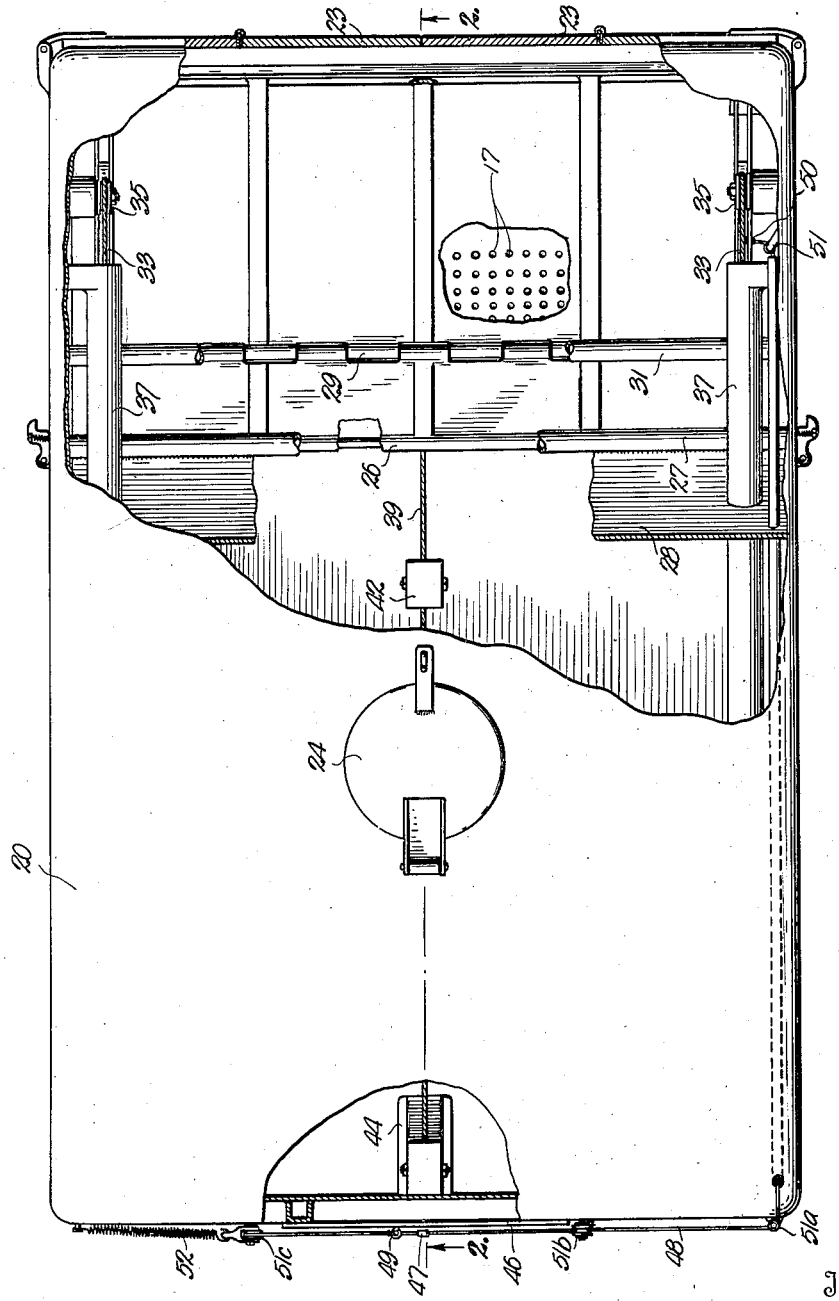

March 22, 1949. H. C. GREEN ET AL. 2,465,222
LOAD-ADVANCING MECHANISM FOR TRUCK BODIES
Filed Jan. 12, 1946 3 Sheets-Sheet 1

Inventors
Harvey C. Green
George E. Bennett
By Thos. E. Scofield
Attorney

March 22, 1949.  H. C. GREEN ET AL  2,465,222
LOAD-ADVANCING MECHANISM FOR TRUCK BODIES
Filed Jan. 12, 1946  3 Sheets-Sheet 2

Inventors
Harvey C. Green
George E. Bennett
By Thos. E. Scofield
Attorney

March 22, 1949. H. C. GREEN ET AL 2,465,222
LOAD-ADVANCING MECHANISM FOR TRUCK BODIES
Filed Jan. 12, 1946 3 Sheets-Sheet 3

Inventors
Harvey C. Green
George E. Bennett

By Thos. E. Scofield
Attorney

Patented Mar. 22, 1949

2,465,222

UNITED STATES PATENT OFFICE 2,465,222

LOAD-ADVANCING MECHANISM FOR TRUCK BODIES

Harvey C. Green and George E. Bennett, Kansas City, Kans.; said Green assignor to said Bennett Application January 12, 1946, Serial No. 640,746

10 Claims. (Cl. 214—67)

1

This invention relates to improvements in truck bodies and refers more particularly to a load-advancing mechanism for use within a truck body to push loaded material forwardly as it is introduced into the rear end opening of the body.

The salient novelty in the invention resides in the manner in which a pusher plate is pivoted within the body. The pivots upon which the plate is swung cause the plate to travel from an overhead position along the floor of the body to an advanced or forward position. During this travel it moves materials introduced through the end opening of the body forwardly compacting them so the rear wall of the mass is inclined in a forward direction and less susceptible to shifting with the movement of the vehicle.

Heretofore load-shifting mechanisms have been devised utilizing a conveyor screw or other apparatus for moving the load forwardly in the body. In none of these, however, is the load compacted and held in a forward position by the action of a pusher plate or end gate.

An object, therefore, of the invention is to provide a truck body having a rear end opening and a pusher plate pivoted within the body in a manner that it may be swung across the end opening and along the rear of the floor to advance materials forwardly in the body.

Another object is to provide a load-advancing mechanism including a pivoted pusher plate which has a travel from an overhead position to a forward or advanced position, and resilient tension springs whose stretching moment is somewhat greater than the weight of the plate so the plate is returned to the overhead position after it has traveled through its working stroke.

A further object is to provide a load-advancing mechanism rotated through its working stroke by power transmitted from the vehicle's engine and controlled from the driver's seat.

A still further object is to provide a load-advancing mechanism including a pivoted pusher plate, actuated by a cable and winch mechanism driven from the vehicle engine and tension springs for returning the plate after each working stroke.

Another object is to provide an indicator visible from the driver's seat which registers the direction of travel as well as the position of the pusher plate in the body.

Other and further objects of the invention will appear from the following description.

Figure 2:
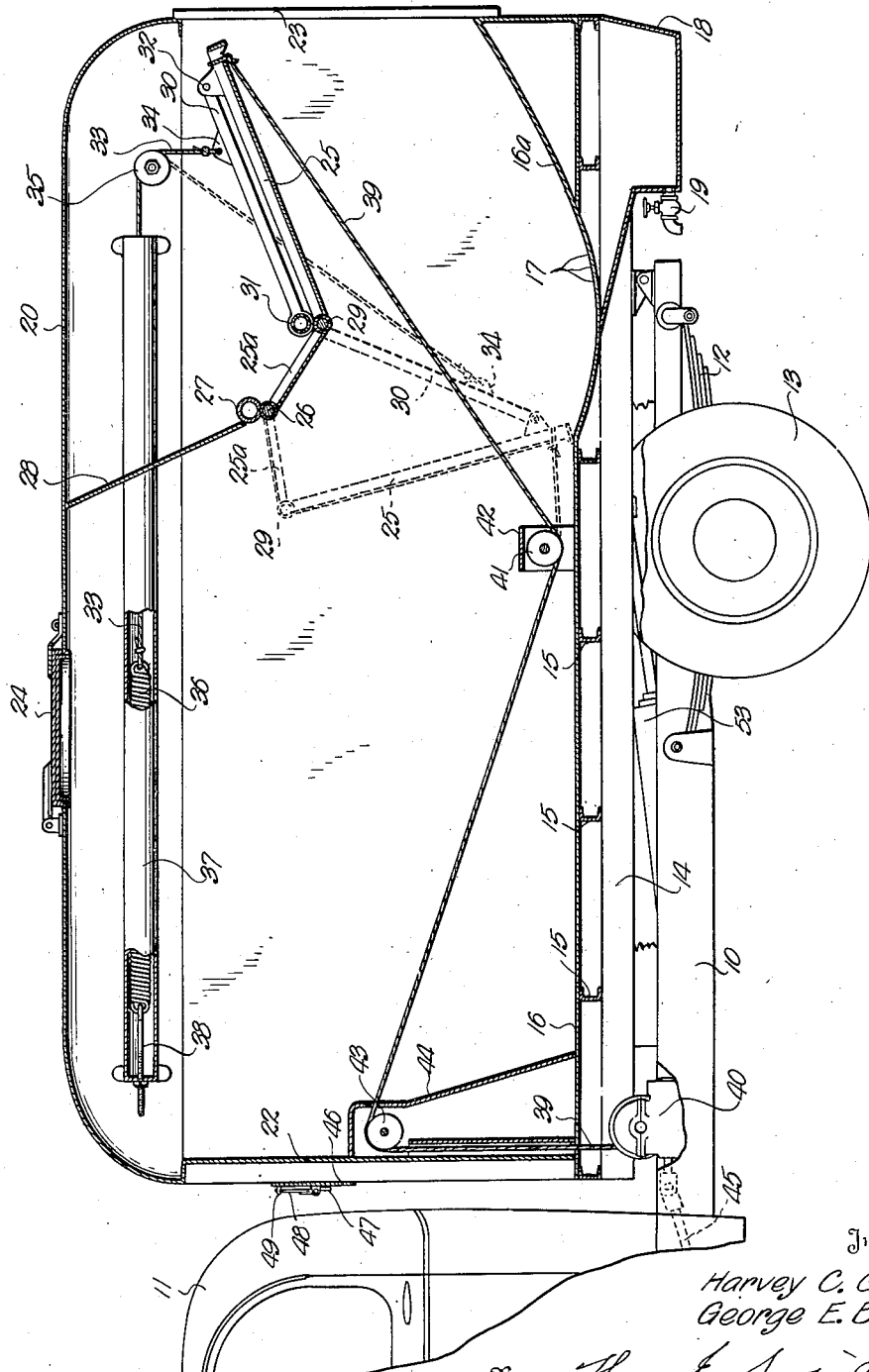
Figure 3:
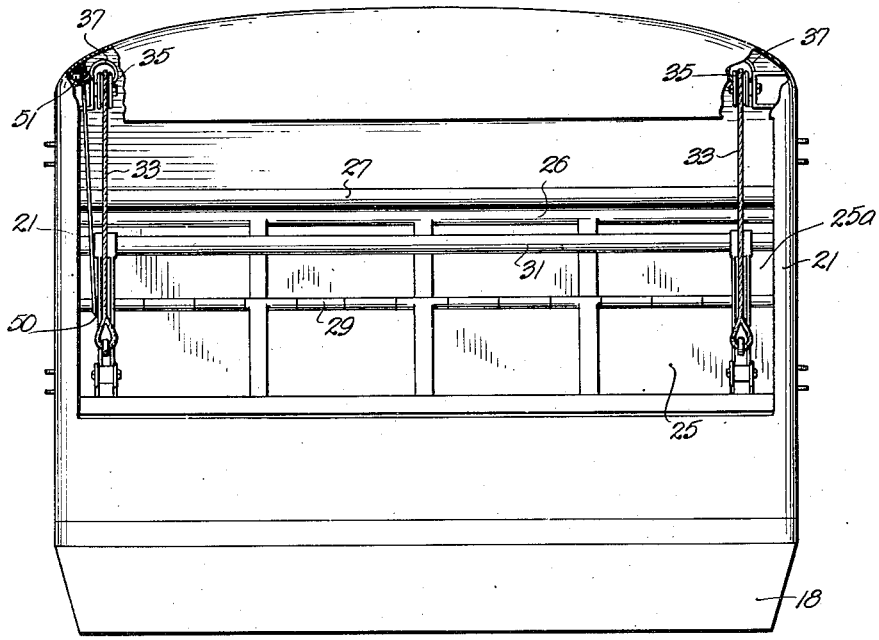
Figure 4:
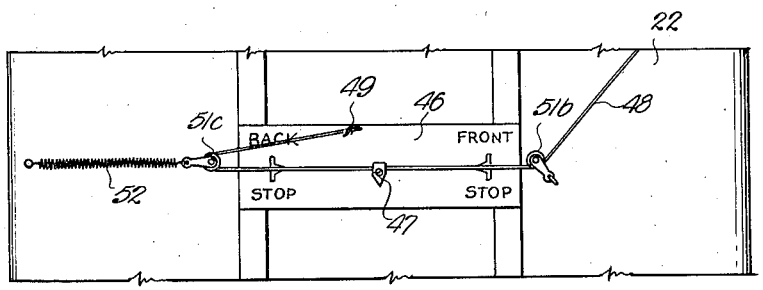

In the accompanying drawings which form a part of the instant specification and are to be read in conjunction therewith, and in which like reference numerals indicate like parts in the various views, Fig. 1 is a top plan of a truck body in which an embodiment of the invention is mounted with parts broken away, Fig. 2 is a view taken along the line 2—2 in Fig. 1 in the direction of the arrows, Fig. 3 is a rear view of the truck body shown in Fig. 1 with parts broken away, Fig. 4 is an enlarged detail of the indicator which registers the position of the pusher plate.

Referring to the drawings, and particularly Fig. 2, there is shown at 10 a truck frame on which a body is mounted, and a portion of the driver's cab at 11. The truck frame and body are carried on rear springs 12 mounted upon an axle which has wheels 13. Supported upon the frame of the vehicle are longitudinal stringers 14 and transverse eye beam supports 15 upon which rest the floor 16 of the body. It will be noted that the front portion of the floor is flat for a distance somewhat aft of the center of the body. The rear portion of the floor is arcuate in cross section as indicated at 16a and has perforations or drain holes 17 allowing liquid to drain from the floor into drain pan 18. Liquid collected in the drain pan is drawn off through faucet 19. At the rear end of the body is an opening which extends substantially the entire width thereof shown best in Fig. 3. It is through this end opening that the load is charged. The top, sides and front of the body are indicated by numerals 20, 21 and 22, respectively. To close the rear opening are provided hinged doors 23 shown in Figs. 1 and 2. In the top is a hinged clean-out door or manhole plate 24.

The load-advancing mechanism is mounted inside the body and consists of a pusher plate having a lower section 25 and an upper secton 25a hinged thereto, the assembly pivoted upon a transverse rod 26 extending transversely across the body. This pivot rod is attached to a transverse pipe 27 also extending across the body and forming the lower extremity of the diagonal partition wall 28. Sections 25 and 25a of the pusher plate are hinged at an intermediate point 29. The pusher plate has a width substantially that of the body. Behind section 25 of the pusher plate are support members 30. These support members are pivoted at one end to a pipe 31 extending transversely across the body and located below and behind pivot 26. At their other ends they are pivoted at 32 to ears extending from the back and near the bottom of the pusher plate.

Supporting the pusher plate at each side are cables 33 attached at one of their ends to eyelets or perforated plates 34 on supports 30. Cables 33 run over pulleys or sheaves 35 mounted on brackets on the sides of the body near the top. The opposite ends of cables 33 are fastened to tension springs 36 enclosed within the tubes 37. The springs are fixedly attached to the ends of the tubes by means of bolts 38. The resiliency of the springs or their stretching moment is adjusted to normally support the pusher plate in its overhead position. After the plate has been rotated through its working stroke, as hereinafter explained, it is released and automatically returned to its initial or overhead position shown in full lines in Fig. 2. The working stroke of the pusher plate is from the full line position to the dotted line position in Fig. 2.

To operate the pusher plate, cable 39 attached centrally of the pusher plate near its lower edge is shortened by winding it upon the spool of a winch diagrammatically shown at 40. This cable runs beneath pulley 41 within an arch support 42 affixed to the floor 16 of the body and over pulley 43 within the hollow pedestal 44 at the front of the body. The winch 40 is driven from the engine of the vehicle through propeller shaft diagrammatically shown in Fig. 2 at 45. A clutch, not shown, for connecting the engine to the propeller shaft which drives the winch is operable from the driver's seat. There also is provided a reverse gear mechanism operable from the driver's seat which permits the winch to unwind and the tension springs 36 to return the pusher plate to its overhead position as shown in full lines in Fig. 2.

The travel of the pusher plate is diagrammatically indicated in Fig. 2. When cable 39 is wound upon the spool of the winch by power transmitted from the vehicle engine the lower end of the pusher plate is drawn down through an arc which is centered first at pivot 31. Since the supports 30 at the back of the pusher are pivoted both to the bottom of the plate at 32 and to the body at 31', shortening of the cable 39 draws the bottom of the pusher plate downwardly around the pivot point 31. With the downward movement of the supports, hinges 29 in the pusher will describe an arc centered upon pivot 26 until it reaches its forward position indicated in dotted lines in Fig. 2. At this time the lower edge of the pusher plate has advanced to the dotted line position in Fig. 2 at the front of the curved portion of the floor. Note the location at this time of the supports 30 and sections 25 and 25a of the pusher plate. In this position the pusher plate has scraped forwardly materials introduced through opening 23 in the rear of the body. It also has moved the upper portion of the accumulated mass in the body ahead of the lower portion, reducing likelihood of the materials from working back when the vehicle is moved. It is contemplated that a pair of lateral cables at the sides of the body may be substituted for the single cable 39 located in the central part of the body. The construction shown has been successfully employed on garbage, trash and refuse trucks and is a somewhat simpler and less expensive arrangement than using a double winch and a pair of cables for operating the pusher plate.

In order that the driver may determine the direction of travel and the position of the pusher plate at all times, an indicator shown in Fig. 4 is located on the front of the body. This indicator consists of a plate 46 across which moves the indicator hand 47. This indicator hand is fixedly attached to a cable 48, one end of which is anchored to the plate at 49, the other end to the pusher plate at 50 shown in Fig. 1. The cable runs over a series of pulleys 51, 51a, 51b and 51c located along the course of the cable to reduce friction and change its direction. Cable 51c is resiliently attached to the front of the body by a spring 52 which permits a limited movement of the indicator hand across the registering plate 46 with the movement of the pusher plate. When the hand 47 indicates the pusher in a back position, the pusher is located as shown in full lines in Fig. 2. When the hand indicates the pusher in a front position it is as shown in the dotted line position in Fig. 2. Since there is a rear window in the cab 11, all the driver need do is look around to determine the position of the pusher.

While a power operated winch has been indicated to move the pusher plate forwardly and tension springs for returning the plate to the overhead position, it is contemplated that actuation of the pusher plate in either direction may be accomplished by separate winches, hydraulic rams or a combination of any of these facilities.

When the truck is to be unloaded, the pusher plate is raised to the overhead position. The truck body is then tilted by hydraulic ram 53 and the contents of the body dumped through the rear opening.

While the load-advancing mechanism is particularly adapted for refuse or garbage trucks, it may be used as well for pushing forward or advancing any type of bulky materials which are loaded into the rear end of the truck. Below the rear of the truck is arranged a drain pan from which moisture in the load can be drained off.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described our invention, we claim:

1. In a load-advancing mechanism for truck bodies, the combination with a body having a rear end opening, a pusher plate whose width is substantially that of the body pivoted along its forward edge upon a transverse axis within the body, supports behind the pusher plate pivoted on a second axis transverse of the body located rearwardly of the pusher plate pivot, the free ends of said supports being connected to the rearward free edge of the plate whereby the latter edge, in describing an arc about said second axis, is adapted to sweep across the rear end opening and along the floor of the body in advancing the load forwardly in the body, an intermediate transverse hinge across the pusher plate, and means for swinging the plate from an overhead position to an advanced forward position in the body.

2. A load-advancing mechanism as in claim 1 wherein the pivot within the body for the pusher plate supports is located rearwardly and below the pusher plate pivot and substantially at the pusher plate hinge when the pusher plate is in said overhead position.

3. A load-advancing mechanism as in claim 1 including mechanical means for returning the plate to the overhead position.

4. A load-advancing mechanism as in claim 1 with tension springs imposing a lifting force at the lower portion of the plate, said springs having resiliency or a stretching moment somewhat in excess of the weight of the plate whereby the plate is automatically returned to an overhead position after each working stroke.

5. A load-advancing mechanism as in claim 1 wherein the rear portion of the floor of the body is arcuate in cross section to conform with the arc described by the lower edge of the plate.

6. A load-advancing mechanism as in claim 1 with means for returning the plate to the overhead position and an indicator visible from the driver's seat connected to and operated by the plate for registering the position of the pusher plate.

7. A load-advancing mechanism for a truck body comprising a movable pusher plate normally occupying an overhead position near the rear of the body, one edge of the plate being disposed forwardly of the other, means supporting said one edge so it is movable in an arc about an axis transverse of the body, separate means supporting said other edge so it is movable in an arc of greater radius about a second axis paralleling said first axis but disposed rearwardly of said first axis, and means for applying a force to the plate to move said two edges thereof downwardly and forwardly around their respective axes thereby to advance the load forwardly in the body.

8. A load-advancing mechanism as in claim 7, having spring means connected to said plate and placed under tension by the downward and forward movement of said plate, said spring means effective to restore said plate to normal responsive to the release of said force.

9. A load-advancing mechanism for a truck body comprising a movable pusher plate normally occupying an overhead position near the rear of the body, one edge of said plate being disposed forwardly of the other, means operated to swing said other edge of said plate from its normal position downwardly across the opening of the body and advance it along the floor of the body to a position ahead of the normal position of said one edge of the plate thereby to advance the load in the body, and means adapted concurrently to advance said one edge of the plate whereby it remains ahead of said other edge throughout the movement of the latter.

10. A load-advancing mechanism for a truck body having a rear end opening, comprising a movable pusher plate normally occupying an overhead position near the rear of the body, one edge of said plate being disposed forwardly of the other, means for applying a force to said plate to move it downwardly and forwardly from its normal position in order to advance the load in the body, means so supporting and guiding said one edge of the plate that it remains forward of said other edge throughout the movement of the plate, and separate means so supporting and guiding said other edge of the plate that under the influence of said force it travels downwardly across the rear end opening of the body and advances along the floor of the body to a position forward of the starting position of said one edge of the plate.

HARVEY C. GREEN.
GEORGE E. BENNETT.

REFERENCES CITED

The following references are of record in the file of this patent:

UNITED STATES PATENTS

| Number | Name | Date |
| --- | --- | --- |
| 2,091,519 | Noyer | Aug. 31, 1937 |
| 2,103,128 | Walter | Dec. 21, 1937 |
| 2,263,199 | Wachter et al. | Nov. 18, 1941 |
| 2,323,366 | Barrett | July 6, 1943 |
| 2,339,360 | Sicard | Jan. 18, 1944 |
| 2,371,540 | Mott | Mar. 13, 1945 |

FOREIGN PATENTS

| Number | Country | Date |
| --- | --- | --- |
| 484,826 | Great Britain | May 11, 1938 |